(12) United States Patent
Nakamura (10) Patent No.: US 7,837,018 B2
(45) Date of Patent: Nov. 23, 2010

(54) LOCK-UP DAMPER

(75) Inventor: Takeyuki Nakamura, Osaka (JP)

(73) Assignee: Exedy Corporation, Osaka (JP)

( * ) Notice: Subject to any disclaimer, the term of this patent is extended or adjusted under 35 U.S.C. 154(b) by 362 days.

(21) Appl. No.: 12/171,874

(22) Filed: Jul. 11, 2008

(65) Prior Publication Data
US 2009/0020385 A1 Jan. 22, 2009

(30) Foreign Application Priority Data
Jul. 20, 2007 (JP) .............................. 2007-188943

(51) Int. Cl.
*F16H 45/02* (2006.01)
*F16F 15/12* (2006.01)
(52) U.S. Cl. .................. 192/3.3; 192/213.21; 464/68.8
(58) Field of Classification Search ............. 192/213.2, 192/213.21; 464/68.8
See application file for complete search history.

(56) References Cited

U.S. PATENT DOCUMENTS

| 6,244,401 B1 * | 6/2001 | Maienschein et al. ........ 192/3.3 |
| 7,073,646 B2 * | 7/2006 | Sasse et al. ................. 192/3.29 |
| 7,172,509 B2 * | 2/2007 | Yamamoto et al. ......... 464/68.8 |
| 2005/0023103 A1 * | 2/2005 | Mizukami ................ 192/213.2 |
| 2006/0096823 A1 * | 5/2006 | Maeda et al. .............. 192/3.29 |

FOREIGN PATENT DOCUMENTS

JP S61-252964 A 11/1986

* cited by examiner

*Primary Examiner*—Richard M. Lorence
(74) *Attorney, Agent, or Firm*—Global IP Counselors, LLP (57) ABSTRACT

There is provided a lock-up damper that affords greater design latitude. A lock-up damper 7 comprises a pair of input rotors 71 that rotate integrally, an intermediate plate 73, a turbine hub 43, an output rotor 72, a plurality of first springs 74, and a plurality of second springs 75. The turbine hub 43 is disposed so as to be capable of rotating within a specific angle range with respect to the intermediate plate 73, and is able to come into contact in the rotational direction with the intermediate plate 73. A pair of the output rotors 72 are disposed to the inside in the radial direction of the pair of input rotors 71, and are fixed to the turbine hub 43.

20 Claims, 6 Drawing Sheets

LOCK-UP DAMPER

CROSS-REFERENCE TO RELATED APPLICATIONS

This application claims priority to Japanese Patent Application No. 2007-188943 filed on Jul. 2, 2007. The entire disclosure of Japanese Patent Application No. 2007-188943 is hereby incorporated herein by reference.

BACKGROUND OF THE INVENTION

1. Field of the Invention

The present invention generally relates to a lock-up damper. More specifically, the present invention relates to a lock-up damper used in a fluid torque transmission.

2. Background Information

One known example of a fluid torque transmission is a torque converter equipped with a lock-up device. A lock-up device is a mechanism for mechanically linking a front cover and a turbine, and is disposed in the space between the turbine and the front cover. The lock-up device directly transmits torque from the front cover to the turbine.

A conventional lock-up device has a piston and a lock-up damper. The piston is disposed movably in the axial direction, and slides with the front cover when pressed against the front cover. The lock-up damper has a pair of input members, an intermediate member, a pair of output members, a plurality of first springs that elastically link the pair of input members and a hub flange in the rotational direction, and a plurality of second springs that elastically link the pair of output members and the hub flange in the rotational direction. The pair of input members support the first springs so that they are capable of elastic deformation in the rotational direction, and rotate integrally with the piston. The pair of output members support the second springs so that they are capable of elastic deformation in the rotational direction, and are fixed to a turbine hub. In between the input members and the output members, an intermediate plate functions as an intermediate member that acts on the first and second springs in series.

When the piston is pressed against the front cover by hydraulic pressure, the torque inputted to the front cover is transmitted to the turbine via the piston and the lock-up damper. At this point torsional vibration is absorbed and attenuated by the lock-up damper (see Japanese Laid-Open Patent Application S61-252964, for example).

With a conventional lock-up damper, however, a pin and a slot were employed as a stopper mechanism that restricted the relative rotation of the intermediate plate and the output plate, and the pin was disposed between the second springs in the rotational direction. Therefore, a large maximum value of the relative rotational angle of the intermediate plate and the output plate could not be ensured, and this adversely affected the design latitude of the lock-up damper.

In view of the above, it will be apparent to those skilled in the art from this disclosure that there exists a need for an improved lock-up damper. This invention addresses this need in the art as well as other needs, which will become apparent to those skilled in the art from this disclosure.

SUMMARY OF THE INVENTION

It is an object of the present invention to provide a lock-up damper that affords greater design latitude.

A lock-up damper according to a first aspect of the present invention includes a pair of input members that rotate integrally, an intermediate member, a turbine hub, a pair of output members, at least one first elastic member, and at least one second elastic member. The intermediate member is disposed rotatably with respect to the input members. The turbine hub is disposed rotatably within a specific angle range with respect to the intermediate member, and is able to come into contact with the intermediate member in the rotational direction. The pair of output members are disposed to the inside in the radial direction of the pair of input members, and are fixed to the turbine hub. The first elastic member elastically links the input members and the intermediate member in the rotational direction, and is supported by the pair of input members so as to be capable of elastic deformation in the rotational direction. The second elastic member elastically links the intermediate member and the output members in the rotational direction, and is supported by the pair of output members so as to be capable of elastic deformation in the rotational direction.

With this lock-up damper, since the turbine hub is able to come into contact with the intermediate member in the rotational direction, the stopper mechanism that restricts relative rotation between the intermediate member and the output members is realized by the intermediate member and the turbine hub. As a result, the rotational angle of the intermediate member with respect to the output members is less likely to be restricted by peripheral members, and greater design latitude is afforded.

A lock-up damper according to a second aspect of the present invention is the lock-up damper according to the first aspect, wherein the intermediate member has an annular main component and a plurality of inner peripheral teeth extending inward in the radial direction from the inner peripheral part of the main component. The turbine hub has an annular hub main body linked to the input shaft of a transmission, and a plurality of outer peripheral teeth extending outward in the radial direction from the outer peripheral part of the hub main body and capable of coming into contact in the rotational direction with the inner peripheral teeth.

A lock-up damper according to a third aspect of the present invention is the lock-up damper according to the second aspect, wherein the hub main body has a cylindrical component that is linked to the input shaft, and an annular flange component that extends outward in the radial direction from the cylindrical component. The outer peripheral teeth extend outward in the radial direction from the outer peripheral part of the flange component.

A lock-up damper according to a fourth aspect of the present invention is the lock-up damper according to the third aspect, wherein the intermediate member is disposed in the axial direction between the pair of output members. The pair of output members are fixed to the turbine hub so as to flank the outer peripheral teeth and/or the flange component in the axial direction.

A lock-up damper according to a fifth aspect of the present invention is the lock-up damper according to the fourth aspect, wherein the axial center of the intermediate member substantially coincides with the axial center of the flange component.

A lock-up damper according to a sixth aspect of the present invention is the lock-up damper according to any of the first to fifth aspects, wherein the intermediate member has at least one first hole. This lock-up damper further includes a first friction member, which has an annular first friction component flanked in the axial direction by the input members and the intermediate member, and at least one first protrusion that extends in the axial direction from the first friction component and is fitted into the first hole.

A lock-up damper according to a seventh aspect of the present invention is the lock-up damper according to any of the first to sixth aspects, wherein the intermediate member has at least one second hole. This lock-up damper further includes a second friction member, which has an annular second friction component flanked in the axial direction by the intermediate member and the output members, and at least one second protrusion that extends in the axial direction from the second friction component and is fitted into the second hole.

A lock-up damper according to an eighth aspect of the present invention is the lock-up damper according to the seventh aspect, wherein the second hole is disposed on the outside in the radial direction of the inner peripheral teeth of the intermediate member.

A lock-up damper according to a ninth aspect of the present invention is the lock-up damper according to any of the first to eighth aspects, wherein the turbine hub rotatably supports a turbine shell of the turbine, or a member fixed to the turbine shell. The input members rotate integrally with a drive plate fixed to the turbine shell.

Due the above constitution, the present invention provides a lock-up damper with which greater design latitude can be afforded.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Overall Configuration of Torque Converter

Figure 1:
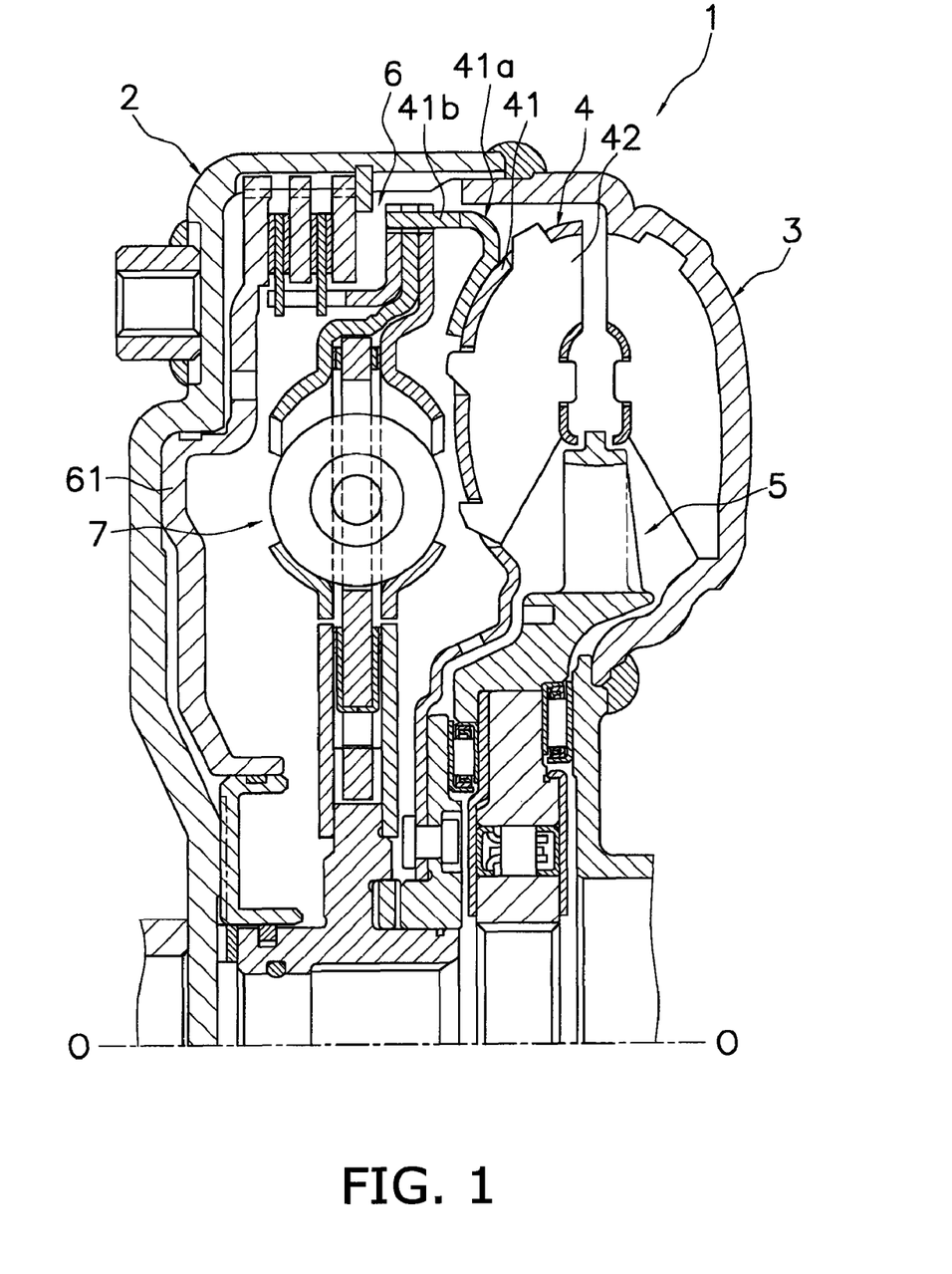
FIG. 1 is a simplified vertical cross-sectional view of a torque converter in accordance with a preferred embodiment of the present invention.

A torque converter 1 featuring a lock-up damper 7 according to a first embodiment of the present invention will be described with reference to FIGS. 1-3. FIG. 1 is a simplified vertical cross-sectional view of the torque converter 1. An engine (not shown) is disposed on the left side in FIG. 1, and a transmission (not shown) is disposed on the right side in FIG. 1. The line O-O shown in FIG. 1 is the rotational axis of the torque converter 1.

The torque converter 1 is a device for transmitting torque from a crankshaft (not shown) of the engine to an input shaft of the transmission, and mainly has a front cover 2 to which torque is inputted, an impeller 3, a turbine 4, a stator 5, and a lock-up device 6.

The impeller 3 is fixed to the front cover 2, and a fluid chamber is formed by the front cover 2 and the impeller 3. The turbine 4 is disposed so as to be opposite the impeller 3 within the fluid chamber. The turbine 4 has a turbine shell 41, a plurality of turbine blades 42 fixed to the turbine shell 41, a support plate 44 fixed to the turbine shell 41 by a plurality of rivets 45, and a turbine hub 43 that rotatably supports the support plate 44. The turbine hub 43 is linked to the input shaft of the transmission (not shown). A drive plate 41a that rotates integrally with an input rotor 71 of the lock-up damper 7 is fixed to the outer peripheral part of the turbine shell 41. The stator 5 is a mechanism for adjusting the flow of hydraulic fluid from the turbine 4 to the impeller 3, and is disposed between the impeller 3 and the turbine 4.

Configuration of Lock-up Device

The lock-up device 6 will be described through reference to FIGS. 1 to 5. FIG. 2 is an elevational view of the lock-up damper 7. FIG. 3 is a cross-sectional view taken along the line III-III shown in FIG. 2. FIG. 4 is a cross-sectional view taken along the line IV-IV shown in FIG. 2. FIG. 5 is a view of a diagram of the mechanical circuit of the lock-up damper 7. In FIG. 2, a first retaining plate 71b (discussed below) is not shown. FIGS. 2 and 5 show the neutral state in which no torque is acting on the lock-up damper 7. As shown in FIGS. 2 and 5, the R1 direction is the rotational direction of the front cover 2, and the R2 direction is the opposite direction.

The lock-up device 6 is a device for mechanically linking the front cover 2 and the turbine 4 as needed, and is disposed between the front cover 2 and the turbine 4 as shown in FIG. 1. The lock-up device 6 has a clutch mechanism 69 that switches the linking state between the front cover 2 and the lock-up damper 7, and the lock-up damper 7, which elastically links the front cover 2 and the turbine hub 43 in the rotational direction.

Clutch Mechanism

Figure 3:
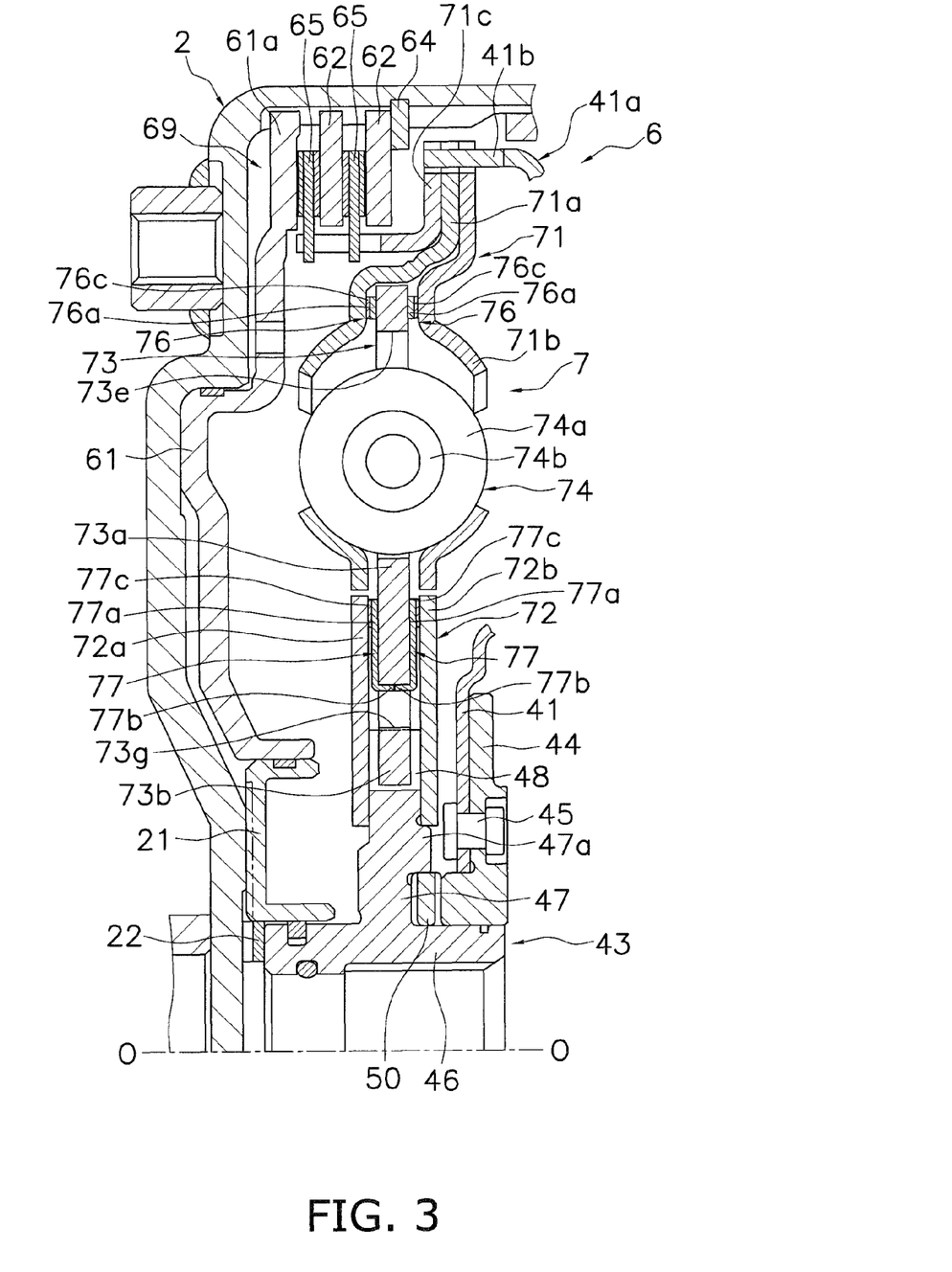
FIG. 3 is a cross-sectional view of lock-up damper taken along the line III-III shown in FIG. 2.
Figure 4:
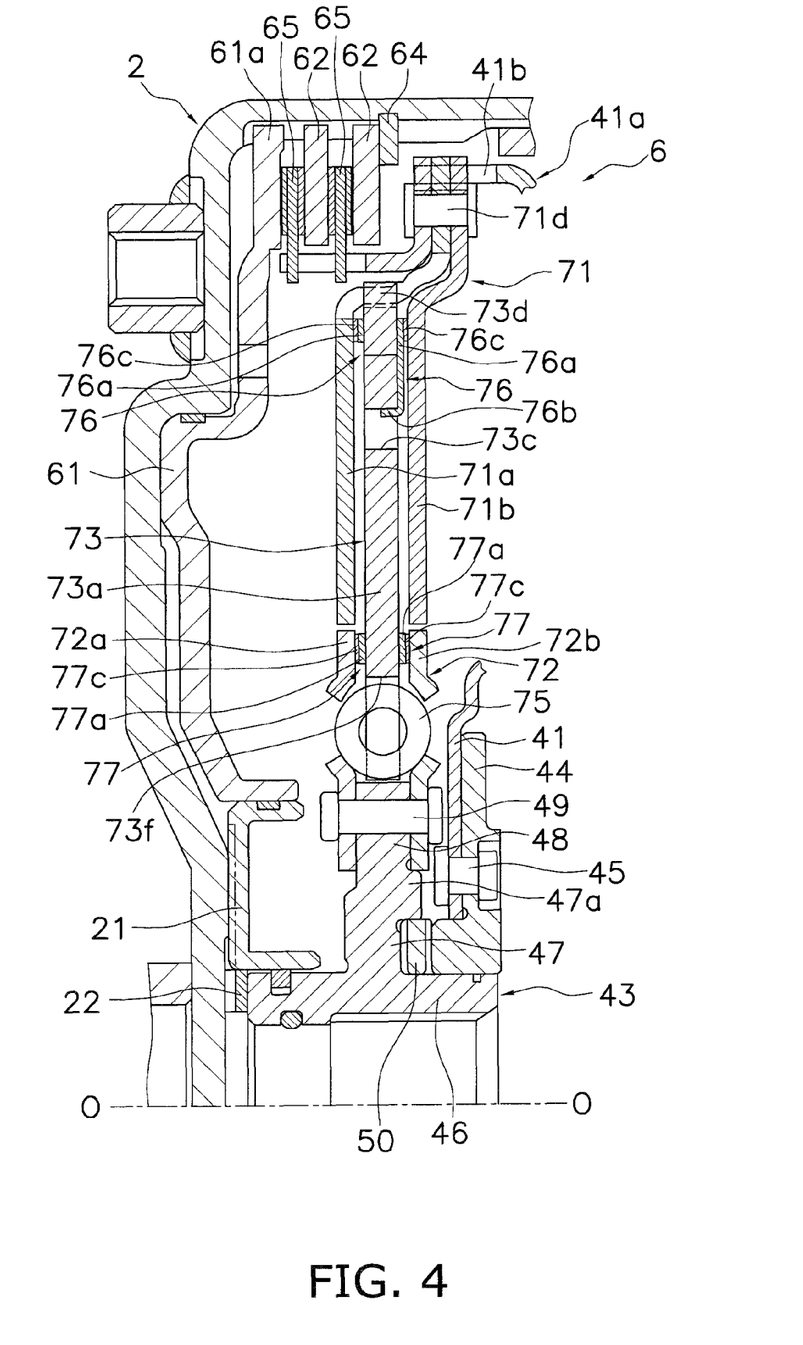
FIG. 4 is a cross-sectional view of the lock-up damper taken along the line IV-IV shown in FIG. 2.
Figure 5:
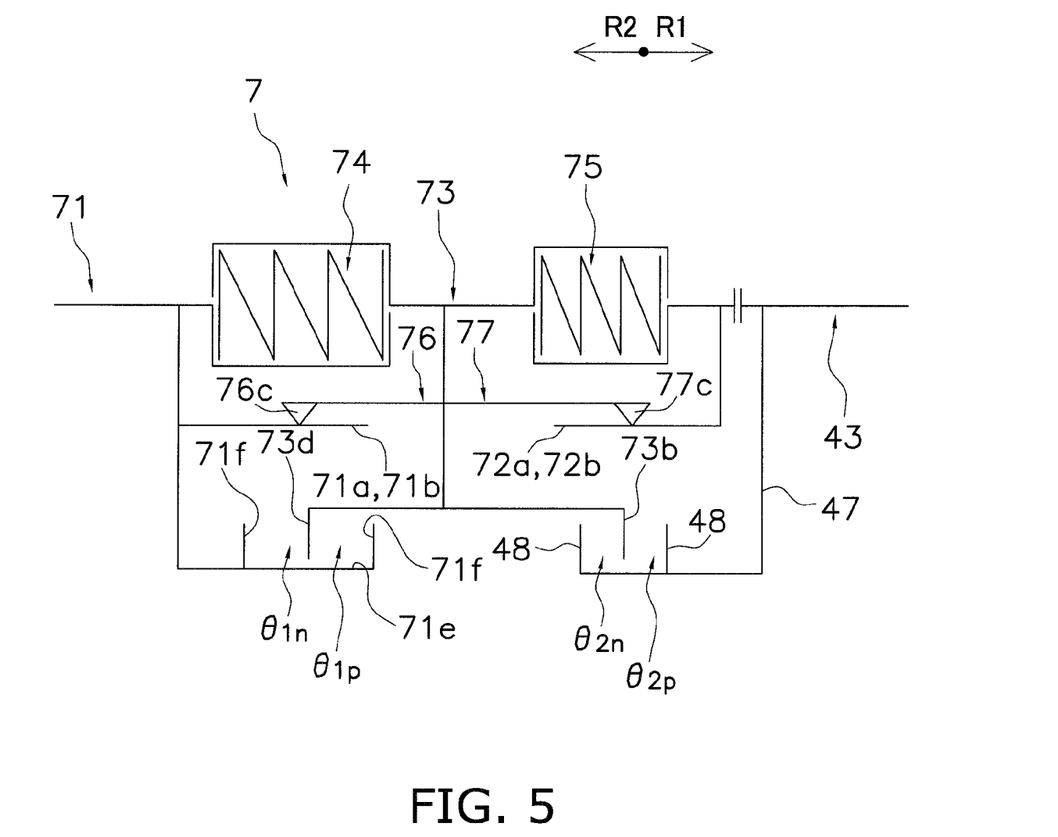
FIG. 5 is a view of a diagram of the mechanical circuit of the lock-up damper.

As shown in FIGS. 3 and 4, the clutch mechanism 69 has a piston 61, two first friction plates 62, and two second friction plates 65. The piston 61, the two first friction plates 62, and the two second friction plates 65 are supported by the front cover 2 so as to be capable of moving in the axial direction. Movement of the first friction plates 62 toward the transmission side with respect to the front cover 2 is restricted by a snap ring 64. The second friction plates 65 rotate integrally with the input rotor 71 of the lock-up damper 7.

Lock-Up Damper

As shown in FIGS. 3 to 5, the lock-up damper 7 has the input rotor 71, an intermediate plate or member 73, an output rotor 72, a plurality of first springs (first elastic member) 74 that elastically link the input rotor 71 and the intermediate plate 73 in the rotational direction, and a plurality of second springs (second elastic member) 75 that elastically link the intermediate plate 73 and the output rotor 72 in the rotational direction.

(1) Input Rotor

The input rotor 71 has a pair of first retaining plates (pair of output members) 71a and 71b serving as a pair of input members, and an input member 71c that rotates integrally with the second friction plates 65. The first retaining plates 71a and 71b and the input member 71c are linked by a plurality of rivets 71d. The first retaining plates 71a and 71b support the first springs 74 so that they are capable of elastic deformation in the rotational direction.

(2) Output Rotor

The output rotor 72, which is fixed to the turbine hub 43, is disposed to the inside in the radial direction of the first retaining plates 71a and 71b. More specifically, as shown in FIGS. 3 and 4, the output rotor 72 has a pair of second retaining plates 72a and 72b, and is fixed to the turbine hub 43 by rivets 49. The second retaining plates 72a and 72b support the second springs 75 so that they are capable of elastic deformation in the rotational direction.

The turbine hub 43 has a cylindrical component 46 that is fixed to the input shaft, a flange component 47 that extends outward in the radial direction from the cylindrical component 46, and a plurality of outer peripheral teeth 48 that extend outward in the radial direction from the outer peripheral part of the flange component 47. The second retaining plates 72a and 72b are fixed by the rivets 49 to the outer peripheral teeth 48 so as to flank the outer peripheral teeth 48 in the axial direction. Therefore, the turbine hub 43 can be thought of as part of the lock-up damper 7.

An annular protrusion 47a that protrudes in the axial direction is formed on the transmission side of the flange component 47, and the second retaining plate 72b is supported in the radial direction by the protrusion 47a. A thrust bearing 50 is fitted to the inside in the radial direction of the protrusion 47a. The thrust bearing 50 is sandwiched between the support plate 44 and the flange component 47, and bears the thrust load to the engine side that acts on the turbine shell 41 via the support plate 44.

(3) Intermediate Plate

The intermediate plate 73 is a member that links the first springs 74 and the second springs 75 in series, and is disposed so as to be capable of relative rotation in the axial direction between the first retaining plates 71a and 71b and in the axial direction between the second retaining plates 72a and 72b. The intermediate plate 73 has an annular intermediate plate main body 73a (main component), a plurality of outer peripheral teeth 73d that extend outward in the radial direction from the outer peripheral part of the intermediate plate main body 73a, and a plurality of inner peripheral teeth 73b that extend inward in the radial direction from the inner peripheral part of the intermediate plate main body 73a.

A plurality of first openings 73e and a plurality of second openings 73f are formed in the intermediate plate main body 73a. The first springs 74 are accommodated in the first openings 73e, and the second springs 75 are accommodated in the second openings 73f. In a neutral state in which no torque is acting on the lock-up damper 7, the relative positions in the rotational direction of the input rotor 71, the intermediate plate 73, and the output rotor 72 are determined by the first springs 74 and the second springs 75.

Figure 2:
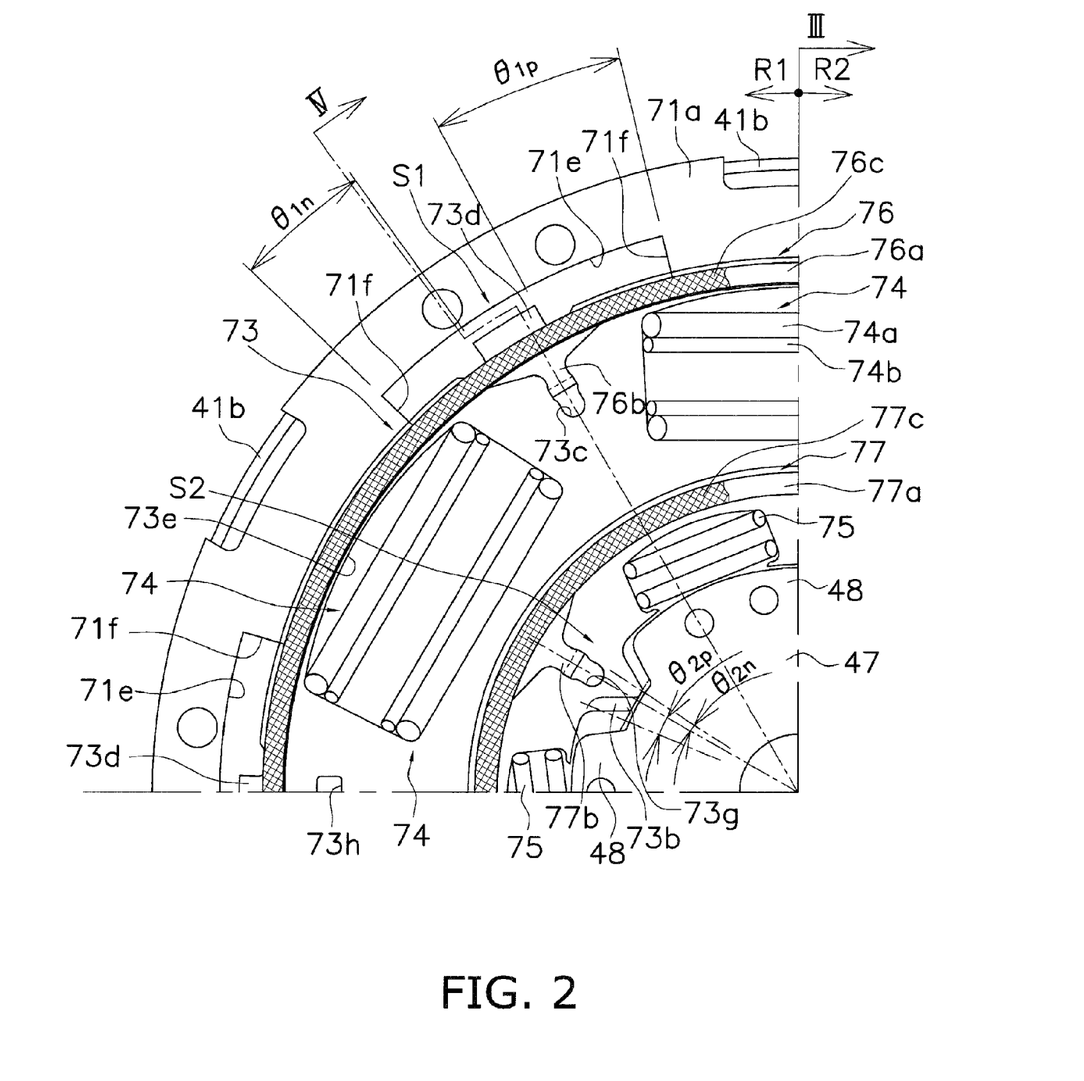
FIG. 2 is a partial elevational view of a lock-up damper of the torque converter.

Referring now to FIG. 2, the outer peripheral teeth 73d pass in the radial direction through a plurality of openings 71e formed in the outer peripheral part of the retaining plate 71a, and are able to come into contact with a pair of end faces 71f formed at the ends in the rotational direction of the openings 71e. The outer peripheral teeth 73d and the openings 71e create a first stopper mechanism S1 that restricts the relative rotation of the input rotor 71 and the intermediate plate 73 to within a specific angle range. In the neutral state shown in FIG. 2, the twist angle corresponding to the gap formed on the R1 side of the outer peripheral teeth 73d is a gap angle $\theta 1p$, and the twist angle corresponding to the gap formed on the R2 side of the outer peripheral teeth 73d is a gap angle $\theta 1n$.

The inner peripheral teeth 73b are disposed in the rotational direction between the outer peripheral teeth 48 of the turbine hub 43, and are able to come into contact with the outer peripheral teeth 48 in the rotational direction. The inner peripheral teeth 73b and the outer peripheral teeth 48 create a second stopper mechanism S2 that restricts the relative rotation of the intermediate plate 73 and the output rotor 72 to within a specific angle range. In the neutral state shown in FIG. 2, the twist angle corresponding to the gap formed on the R1 side of the inner peripheral teeth 73b is a gap angle $\theta 2p$, and the twist angle corresponding to the gap formed on the R2 side of the inner peripheral teeth 73b is a gap angle $\theta 2n$.

Referring now to FIGS. 3 and 4, the lock-up damper 7 further has a pair of annular first friction washers 76 that generate hysteresis torque between the input rotor 71 and the intermediate plate 73, and a pair of annular second friction washers (second f 77 that generate hysteresis torque between the intermediate plate 73 and the output rotor 72. The coefficient of friction between the first friction washers 76 and the input rotor 71, and the coefficient of friction between the second friction washers 77 and the input rotor 71, are set such that the hysteresis torque produced by the first friction washers 76 will be substantially or exactly the same as the hysteresis torque produced by the second friction washers 77. As shown in FIG. 5, the first friction washers 76 and the second friction washers 77 are disposed in series via the intermediate plate 73.

The pair of first friction washers 76 are members that rotate integrally with the intermediate plate 73, and slide with the first retaining plates 71a and 71b. More specifically, the first friction washers 76 each have an annular first main component 76a, a plurality of first tabs 76b (first protrusions) that extend inward in the radial direction from the first main component 76a, and an annular first friction facing 76c fixed to the first main component 76a. The distal ends of the first tabs 76b extend in the axial direction to the intermediate plate 73 side.

The distal ends of the first tabs 76b of one of the first friction washers 76 (the first friction washer 76 disposed on the transmission of the intermediate plate 73) are fitted in the axial direction into first holes 73c formed in the intermediate plate 73. In other words, the distal ends extend toward the front cover 2. The distal ends of the first tabs 76b of the other first friction washer 76 (the first friction washer 76 disposed on the engine side of the intermediate plate 73) are fitted in the axial direction into first holes 73c formed in the intermediate plate 73. In other words, these distal ends extend away from the front cover 2. The first holes 73c and 73h are disposed at substantially the same position in the radial direction, and are disposed alternately in the rotational direction. The distal ends of the first tabs 76b come into contact with the faces of the first holes 73c and 73h on the outside in the radial direction. Due to this configuration, the pair of first friction washers 76 rotate integrally with the intermediate plate 73, and the radial positions of the first friction washers 76 are determined with respect to the intermediate plate 73.

The pair of second friction washers 77 are members that rotate integrally with the intermediate plate 73, and slide with the second retaining plates 72a and 72b. More specifically, the second friction washers 77 have each have an annular second main component (second friction component) 77a, a plurality of second tabs 77b (second protrusions) that extend inward in the radial direction from the second main component 77a, and an annular second friction facing 77c fixed to the second main component 77a. The distal ends of the second tabs 77b extend in the axial direction to the intermediate plate 73 side, and are fitted in the axial direction into second holes 73g formed in the intermediate plate 73. The distal ends of the second tabs 77b disposed on the transmission side and the engine side are also inserted into the second holes 73g. The length in the axial direction of the distal ends of the second tabs 77b is preferably less than half the thickness of the intermediate plate 73, so the second tabs 77b on the engine side and the transmission side do not touch each other.

As discussed above, the intermediate plate 73 causes the first springs 74 and the second springs 75 to act in series between the input rotor 71 and the output rotor 72, and hysteresis torque is generated by the first friction washers 76 and the second friction washers 77 mounted to the intermediate plate 73.

Torsional Characteristics of Lock-Up Damper

Figure 6:
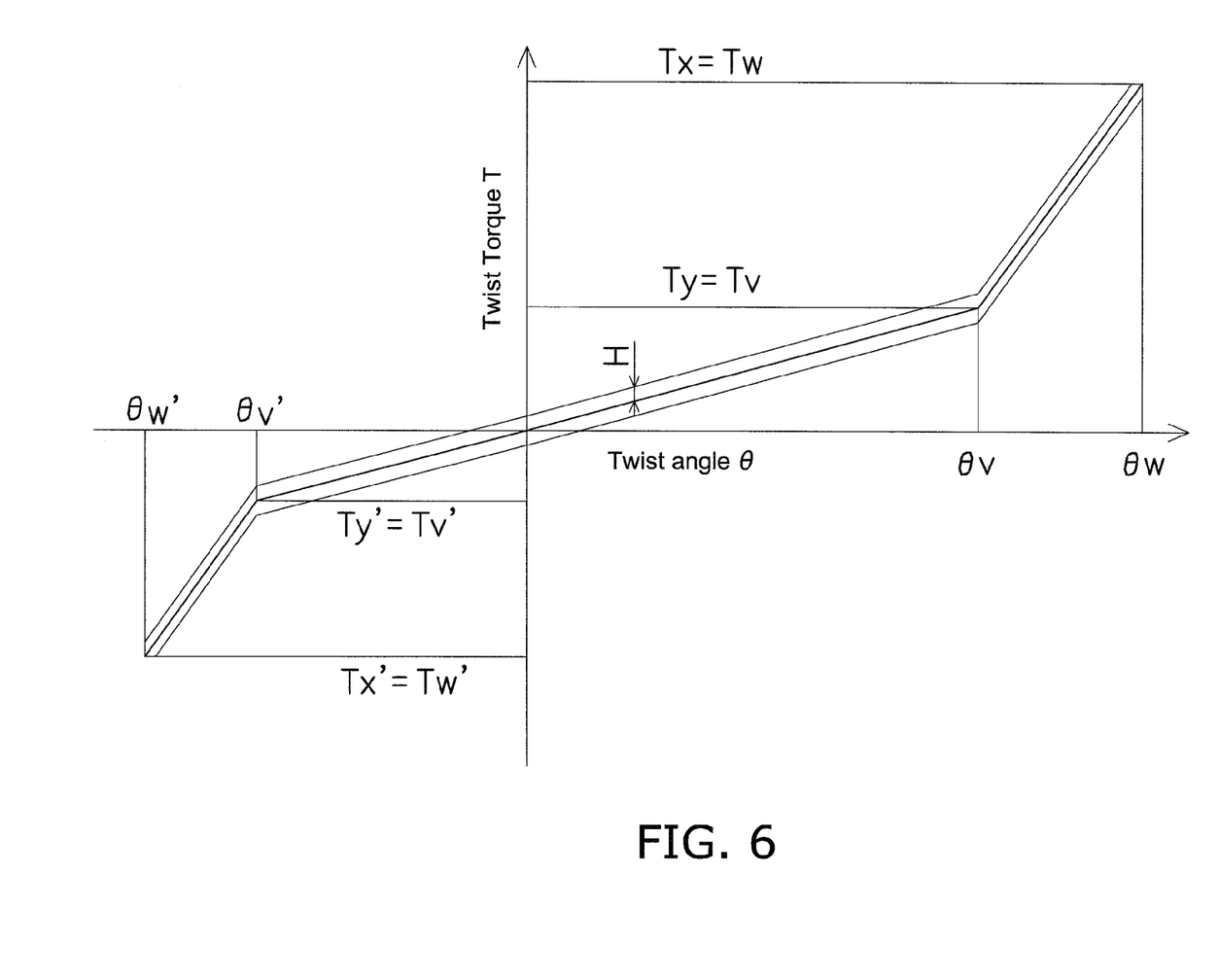
FIG. 6 is a view of a graph of the torsional characteristics of the lock-up damper.

The torsional characteristics of the lock-up damper 7 will now be described. FIG. 6 is a graph of the torsional characteristics of the lock-up damper 7.

As shown in FIG. 6, the torsional characteristics of the lock-up damper 7 change in two stages. More specifically, in the positive first-stage region (twist angle from 0 to θv) and the negative first-stage region (twist angle from 0 to θv'), the first springs 74 and the second springs 75 are compressed in series. In the positive second-stage region (twist angle from θv to θw) and the negative second-stage region (twist angle from θv' to θw'), only the first springs 74 are compressed.

Here, if we let A be the spring constant of the first springs 74 and B the spring constant of the second springs 75, the twist angles θv, θv', θw, and θw' are expressed by the following formulas.

$$\theta v = \theta 1p \times (B/A) + \theta 2p$$

$$\theta v' = \theta 1n \times (B/A) + \theta 2n$$

$$\theta w = \theta 1p + \theta 2p$$

$$\theta w' = \theta 1n + \theta 2n$$

Also, hysteresis torque H is generated by the first friction washers 76 and the second friction washers 77 in the first-stage region, and hysteresis torque H is generated by just the first friction washers 76 in the second-stage region. Here, since the first friction washers 76 and the second friction washers 77 are disposed in series via the intermediate plate 73, the hysteresis torque H is generated at substantially the same lever in the first and second-stage regions.

Operation of Torque Converter

The operation of the torque converter 1 will be described.

When the front cover 2 and the impeller 3 rotate, hydraulic fluid flows from the impeller 3 to the turbine 4, and torque is transmitted from the impeller 3 to the turbine 4 via the hydraulic fluid. The torque transmitted to the turbine 4 is transmitted to an input shaft (not shown) via the lock-up damper 7 and the turbine hub 43.

If the input shaft is rotating at a constant speed, the lock-up device 6 is actuated. More specifically, the piston 61 moves to the transmission side, and the second friction plates 65 are sandwiched between the first friction plates 62 and between the first friction plates 62 and the outer peripheral part 61a of the piston 61. As a result, the input rotor 71 rotates integrally with the front cover 2, and torque is transmitted from the front cover 2 to the lock-up damper 7 via the clutch mechanism 69.

With the lock-up damper 7, the intermediate plate 73 causes the first springs 74 and the second springs 75 to act in series between the input rotor 71 and the output rotor 72. More specifically, when the input rotor 71 rotates in the R1 direction respect to the output rotor 72, the first springs 74 are compressed in the rotational direction between the input rotor 71 and the intermediate plate 73, and the second springs 75 are compressed in the rotational direction between the intermediate plate 73 and the output rotor 72. The result is that relatively low torsional stiffness is obtained in the first-stage region of the torsional characteristics.

Also, when the input rotor 71 and the intermediate plate 73 rotate relatively, the first friction washers 76 slide with the input rotor 71. When the intermediate plate 73 and the output rotor 72 rotate relatively, the second friction washers 77 slide with the output rotor 72. The result is that hysteresis torque H is generated in the first-stage region.

When the twist angle reaches the angle θv, the inner peripheral teeth 73b come into contact with the outer peripheral teeth 48 of the turbine hub 43, and the second stopper mechanism S2 is actuated. As a result, relative rotation stops between the intermediate plate 73 and the output rotor 72, and compression of the first springs 74 stops.

When the input rotor 71 rotates further to the R1 side with respect to the output rotor 72, only the first springs 74 are further compressed in the rotational direction between the input rotor 71 and the intermediate plate 73. The torsional stiffness of the lock-up damper 7 is higher in the second-stage region than in the first-stage region where the first springs 74 and the second springs 75 act in series.

Also, in the second-stage region the intermediate plate 73 does not rotate with respect to the output rotor 72, so the hysteresis torque H is generated only by the first friction washers 76.

Thus, with this lock-up damper 7, a first-stage region of low torsional stiffness and a second-stage region of high torsional stiffness are obtained, and a substantially constant hysteresis torque H is generated in the first and second-stage regions. The result is that torsional vibration inputted to the front cover 2 can be effectively absorbed and attenuated.

Features

Features of the lock-up damper 7 are as follows.

(1) With this lock-up damper 7, it is possible for the turbine hub 43 to come into contact with the intermediate plate 73 in the rotational direction. More specifically, it is possible for the outer peripheral teeth 48 of the turbine hub 43 to come into contact in the rotational direction with the inner peripheral teeth 73b of the intermediate plate 73, and the second stopper mechanism S2 is created by the outer peripheral teeth 48 and the inner peripheral teeth 73b. As a result, it is less likely that the rotational angle of the intermediate plate 73 with respect to the output rotor 72 will be restricted by peripheral members, and this affords greater design latitude.

(2) With this lock-up damper 7, since the second stopper mechanism S2 is created by the inner peripheral teeth 73b of the intermediate plate 73 and the outer peripheral teeth 48 of the turbine hub 43, the second stopper mechanism S2 is stronger than when a pin and slot are used.

(3) With this lock-up damper 7, the intermediate plate 73 is disposed in the axial direction between the pair of second retaining plates 72a and 72b. The pair of second retaining plates 72a and 72b are fixed to the turbine hub 43 by the rivets 49 so as to flank the outer peripheral teeth 48 and the flange component 47 in the axial direction. Consequently, the orientation of the output rotor 72 with respect to the turbine hub 43 is stabilized, and the second springs 75, the intermediate plate 73, etc., operate more stably.

(4) With this lock-up damper 7, since the axial center of the intermediate plate 73 substantially coincides with the axial center of the flange component 47 (more precisely, the axial center of the outer peripheral teeth 48), it is less likely that unnecessary force in the axial direction will act on the flange component 47 or the intermediate plate 73 during operation of the second stopper mechanism S2. This increases the stopper strength of the second stopper mechanism S2. Also, strength of the second stopper mechanism S2 can be ensured while making the intermediate plate 73 and the flange component 47 thinner, which allows the lock-up damper 7 to be made smaller in the axial direction.

(5) With this lock-up damper 7, the first tabs 76b of the first friction washers 76 are fitted into the first holes 73c and second holes 73g of the intermediate plate 73, and the second tabs 77b of the second friction washers 77 are fitted into the second holes 73g of the intermediate plate 73. Accordingly, a friction generating mechanism can be achieved with a simple structure.

Also, whether or not hysteresis torque is generated in the first and second-stage regions can be set by making adjustments by providing both the first friction washers 76 and the second friction washers 77, or by providing just one of the two.

Furthermore, the twist angles θv, θw, etc., in the first and second-stage regions can be varied by adjusting the angles θ1p and θ1n of the first stopper mechanism S1 and the angles θ2p and θ2n of the second stopper mechanism S2.

Thus, many more different torsional characteristics can be achieved with this lock-up damper 7 than with a conventional lock-up damper.

(6) With this lock-up damper 7, the second holes 73g are disposed to the outside in the radial direction of the inner peripheral teeth 73b of the intermediate plate 73, and the first holes 73c are disposed to the inside in the radial direction of the outer peripheral teeth 73d. Accordingly, there is less decrease in the strength of the intermediate plate 73 due to the first holes 73c and the second holes 73g.

(7) With this lock-up damper 7, the turbine shell 41 rotates integrally with the input rotor 71 of the lock-up damper 7, so there is greater inertia on the input side of the lock-up damper 7. This improves the torsional vibration attenuation performance of the lock-up damper 7 during lock-up.

Other Embodiments

The specific constitution of the present invention is not limited to or by the embodiment given above, and various changes and modifications are possible without departing from the gist of the invention.

(1) The constitution of the clutch mechanism 69 is not limited to or by the embodiment given above. For example, a type is possible in which there are no first friction plates 62 or second friction plates 65, and the piston 61 slides directly with the front cover 2. In this case, the piston 61 rotates integrally with the input rotor 71 of the lock-up damper 7.

(2) The above-mentioned lock-up damper 7 has the first friction washers 76 and second friction washers 77. However, it is also conceivable that only the first friction washers 76 are provided, or that only the second friction washers 77 are provided. For example, when only the second friction washers 77 are provided, the hysteresis torque H is generated only in the first-stage region, and no hysteresis torque H is generated in the second-stage region.

(3) In the above embodiments, the turbine shell 41 and the turbine hub 43 are linked via the lock-up damper 7, but the turbine shell 41 may be fixed to the turbine hub 43 without the lock-up damper 7 being interposed.

(4) The constitution of the components other than the lock-up damper 7 is not limited to or by the above embodiments. For example, this lock-up damper 7 can also be applied to a fluid joint other than a torque converter.

General Interpretation of Terms

In understanding the scope of the present invention, the term "configured" as used herein to describe a component, section or part of a device that is constructed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a lock-up damper of the present invention. Accordingly, these terms, as utilized to describe the present invention should be interpreted relative to a lock-up damper of the present invention as normally used. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A lock-up damper, comprising:
    pair of input members being configured to rotate integrally;
    an intermediate member being rotatably disposed with respect to the input members;
    turbine hub being rotatably disposed within a specific angle range with respect to the intermediate member, and being configured to contact the intermediate member in the rotational direction;
    pair of output members being disposed to the inside in the radial direction of the pair of input members, and being fixed to the turbine hub;
    at least one first elastic member elastically linking the input members and the intermediate member in the rotational direction, and being supported by the pair of input members to be elastically deformable in the rotational direction; and
    at least one second elastic member elastically linking the intermediate member and the output members in the rotational direction, and being supported by the pair of output members to be elastically deformable in the rotational direction.

2. The lock-up damper according to claim 1, wherein
    the intermediate member has an annular main component and a plurality of inner peripheral teeth extending inward in the radial direction from the inner peripheral part of the main component, and
    the turbine hub has an annular hub main body configured to be linked to an input shaft of a transmission, and a plurality of outer peripheral teeth extending outward in the radial direction from the outer peripheral part of the hub main body and configured to contact with the inner peripheral teeth in the rotational direction.

3. The lock-up damper according to claim 2, wherein
the hub main body has a cylindrical component that is configured to be linked to the input shaft, and an annular flange component that extends outward in the radial direction from the cylindrical component, and
the outer peripheral teeth extend outward in the radial direction from the outer peripheral part of the flange component.

4. The lock-up damper according to claim 3, wherein
the intermediate member is disposed between the pair of output members in the axial direction, and
the pair of output members are fixed to the turbine hub to flank the outer peripheral teeth and/or the flange component in the axial direction.

5. The lock-up damper according to claim 4, wherein
the axial center of the intermediate member substantially coincides with the axial center of the flange component.

6. The lock-up damper according to claim 5, further comprising
a first friction member, which has an annular first friction component flanked in the axial direction by the input members and the intermediate member, and at least one first protrusion that extends in the axial direction from the first friction component,
wherein the intermediate member has at least one first hole, and the at least one first protrusion is fitted into the first hole.

7. The lock-up damper according to claim 6, further comprising
a second friction member, which has an annular second friction component flanked in the axial direction by the intermediate member and the output members, and at least one second protrusion that extends in the axial direction from the second friction component,
wherein the intermediate member has at least one second hole, and the at least one second protrusion is fitted into the second hole.

8. The lock-up damper according to claim 7, wherein
the second hole is disposed on the outside in the radial direction of the inner peripheral teeth of the intermediate member.

9. The lock-up damper according to claim 8, wherein
the turbine hub rotatably supports a turbine shell of the turbine, or a member fixed to the turbine shell, and
the input members rotate integrally with a drive plate fixed to the turbine shell.

10. The lock-up damper according to claim 3, further comprising
a first friction member, which has an annular first friction component flanked in the axial direction by the input members and the intermediate member, and at least one first protrusion that extends in the axial direction from the first friction component,
wherein the intermediate member has at least one first hole, and the at least one first protrusion is fitted into the first hole.

11. The lock-up damper according to claim 2, further comprising
a first friction member, which has an annular first friction component flanked in the axial direction by the input members and the intermediate member, and at least one first protrusion that extends in the axial direction from the first friction component,
wherein the intermediate member has at least one first hole, and the at least one first protrusion is fitted into the first hole.

12. The lock-up damper according to claim 11, further comprising
a second friction member, which has an annular second friction component flanked in the axial direction by the intermediate member and the output members, and at least one second protrusion that extends in the axial direction from the second friction component,
wherein the intermediate member has at least one second hole, and the at least one second protrusion is fitted into the second hole.

13. The lock-up damper according to claim 1, further comprising
a first friction member, which has an annular first friction component flanked in the axial direction by the input members and the intermediate member, and at least one first protrusion that extends in the axial direction from the first friction component,
wherein the intermediate member has at least one first hole, and the at least one first protrusion is fitted into the first hole.

14. The lock-up damper according to claim 13, further comprising
a second friction member, which has an annular second friction component flanked in the axial direction by the intermediate member and the output members, and at least one second protrusion that extends in the axial direction from the second friction component,
wherein the intermediate member has at least one second hole, and the at least one second protrusion is fitted into the second hole.

15. The lock-up damper according to claim 14, wherein
the second hole is disposed on the outside in the radial direction of the inner peripheral teeth of the intermediate member.

16. The lock-up damper according to claim 15, wherein
the turbine hub rotatably supports a turbine shell of the turbine, or a member fixed to the turbine shell, and
the input members rotate integrally with a drive plate fixed to the turbine shell.

17. The lock-up damper according to claim 1, further comprising
a friction member, which has an annular friction component flanked in the axial direction by the intermediate member and the output members, and at least one protrusion that extends in the axial direction from the friction component,
wherein the intermediate member has at least one hole, and the at least one protrusion is fitted into the hole.

18. The lock-up damper according to claim 17, wherein
the hole is disposed on the outside in the radial direction of the inner peripheral teeth of the intermediate member.

19. The lock-up damper according to claim 18, wherein
the turbine hub rotatably supports a turbine shell of the turbine, or a member fixed to the turbine shell, and
the input members rotate integrally with a drive plate fixed to the turbine shell.

20. The lock-up damper according to claim 1, wherein
the turbine hub rotatably supports a turbine shell of the turbine, or a member fixed to the turbine shell, and
the input members rotate integrally with a drive plate fixed to the turbine shell.

* * * * *